United States Patent [19]

Valdez

[11] 4,237,765

[45] Dec. 9, 1980

[54] GUITAR BODY WITH IMPROVED NECK STRUCTURE

[76] Inventor: Arthur F. Valdez, 8807 Santa Monica Blvd., West Hollywood, Calif. 90069

[21] Appl. No.: 938,341

[22] Filed: Aug. 31, 1978

Related U.S. Application Data

[63] Continuation-in-part of Ser. No. 796,839, May 13, 1977, abandoned.

[51] Int. Cl.³ .................... G01D 3/18

[52] U.S. Cl. .................... 84/293

[58] Field of Search .................... 84/173, 267, 293

[56] References Cited

U.S. PATENT DOCUMENTS

| | | | |
|---|---|---|---|
| 2,795,988 | 6/1957 | MacCaferri | 84/293 |
| 3,443,018 | 5/1969 | Krebs | 84/293 X |
| 3,481,238 | 12/1969 | Veres | 84/293 X |
| 3,575,078 | 4/1971 | Carrier | 84/173 |
| 3,783,731 | 1/1974 | Pash | 84/293 X |

*Primary Examiner*—Lawrence R. Franklin
*Attorney, Agent, or Firm*—Thomas A. Fournie

[57] ABSTRACT

Disclosed are guitars having neck structure with distinct longitudinally spaced apart substantially transversely extending thumb receiving notches formed inclined to the flat neck front surface to lie side by side in the back surface thereof. The thumb receiving guide notches are disclosed arranged for both flamenco and/or popular music guitarists. The thumb receiving guide notches serve inter alia each of the following functions: both as a sight and feel guide for aiding a guitar player in learning and ascertaining the proper longitudinal placement of his hand along the guitar neck as he repositions his hand up and down the guitar neck while playing the guitar; as a thumb stop which aids the guitarist in stopping with precision his hand movement up and down the guitar neck and to quickly and surely regrip the guitar neck; as hand positioning guide which in the case of a flamenco guitarist disciplines the guitarist to maintain proper hand position; and as a thumb pivot surface which aids playing the guitar. For the purpose of teaching a person to play a guitar, numerals or other identifying marks may be placed in the thumb guide notches to further visually aid the person in the correct positioning and repositioning of his hand along the guitar neck.

15 Claims, 7 Drawing Figures

FIG. 1.
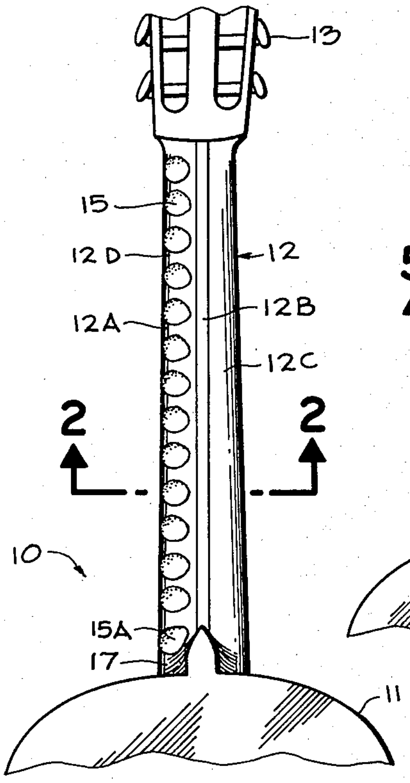
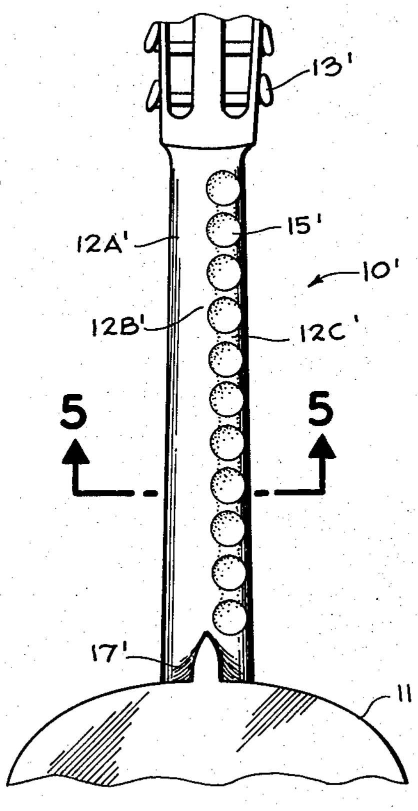
FIG. 4.
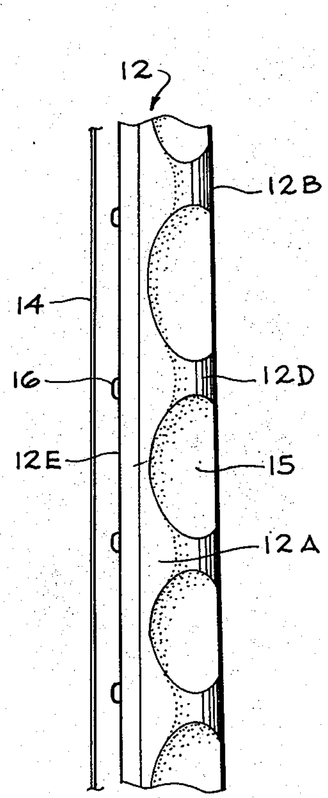
FIG. 3.
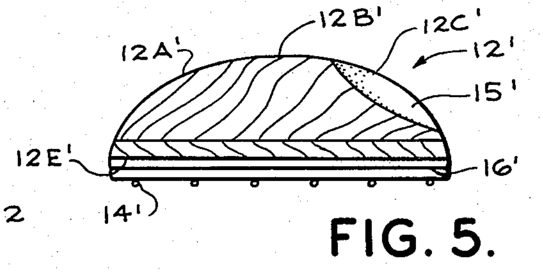
FIG. 5.
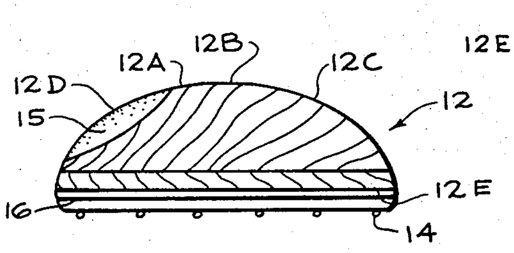
FIG. 2.
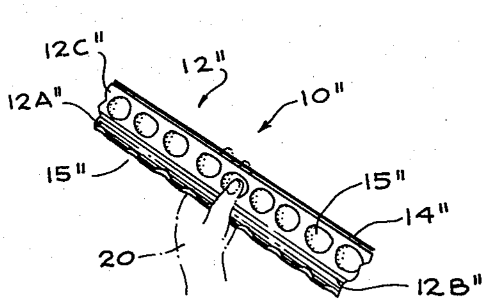
FIG. 7.
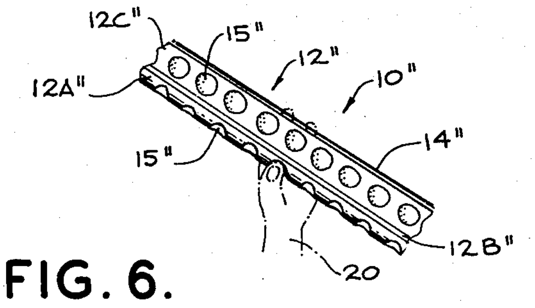
FIG. 6.

GUITAR BODY WITH IMPROVED NECK STRUCTURE

CROSS-REFERENCE TO RELATED APPLICATION

This is a continuation-in-part of application Ser. No. 796,839, filed May 13, 1977, now abandoned.

BACKGROUND OF THE INVENTION

The present invention relates to musical instruments and more particularly to guitar bodies with improved neck structure effective to facilitate the teaching of guitar and aid in the proper playing of same.

A guitar is played by strumming the portion of the guitar strings extending across the guitar base with one hand while simultaneously controlling along the neck of the guitar the vibration of the individual strings with the fingers of the other hand. In playing the guitar, the guitar player moves his hand up and down the guitar neck and uses his fingers to control string vibration in two respects. Firstly, the vibration of already vibrating strings may be selectively damped and stopped by placing a finger thereagainst. Secondly, the pitch of sounds generated by the strings are selectively varied by controlling the effective length of the strings by clamping the strings prior to vibration against the guitar neck at selected points along their lengths.

To play the guitar properly, the guitar player must first learn the proper hand position for his hand around the guitar neck, this being particularly important for a flamenco guitarist. Also, he must learn the correct placements of his hand along the guitar neck for playing different notes. With his hand in a correct placement along the guitar neck, a flamenco guitarist utilizes the point of his thumb contact against the back of the guitar neck as a pivot point or surface, his hand and the string controlling fingers thus pivoting about the pivot defined by the fixed placement of the thumb on the back of the guitar neck. Additionally, in controlling the effective length of the guitar strings, it is important that a guitar player be able to stop with precision his hand movement up and down the guitar neck and be able to quickly, surely and properly regrip the guitar neck at appropriately clamp the guitar strings against the guitar neck.

Heretofore, in teaching a guitarist to play, and particularly a flamenco guitarist, sight marks in the form of visually perceptible dots have been placed along the guitar neck to aid the learning guitarist the correct place of his hand along the guitar neck for playing different notes. These sight dots, however, have been mere visual guides and have not provided any positive aid to insure and discipline the guitarist hand positioning and proper placement.

Also heretofore, it has been known to associate channels or recesses with guitar neck structure for purposes distinctly different from those of the present invention. On example of such structure of different purpose is shown in Pelensky, U.S. Pat. No. 3,392,618 wherein a guitar having dual and triple neck areas is shown. In order to enable a guitar player's fingers to span all of the combined fingerboard area provided by its dual and triple neck areas, longitudinal extending thumb channels are associated with the dual and triple neck areas. Another example of such prior art structure of different purpose is shown in Veres, U.S. Pat. No. 3,481,238. In Veres, guitar neck structure is disclosed having traverse recesses defined in the top of the guitar neck or fretboard which diminish the obstruction met by the guitarist when fingering the guitar strings during playing. While the Pelensky and Veres patents may be of some general interest, the present invention, as pointed out hereinafter, does not relate to the dominant purposes of Pelensky and Veres of providing complete finger accessibility of guitar strings.

SUMMARY OF THE INVENTION

It is accordingly an object of the present invention to provide an improved guitar characterized by having neck structure with transversely extending thumb receiving guide notches formed therein which function as a sight and feel guide for aiding a guitar player in learning and ascertaining the proper longitudinal placement of his hand along the guitar neck as he repositions his hand up and down the guitar neck while playing the guitar; as a thumb stop which aids the guitarist in stopping with precision his hand movement up and down the guitar neck and to quickly and surely regrip the guitar neck; as a hand positioning guide which disciplines a guitarist, and particularly a flamenco guitarist, to maintain proper hand position; and as a thumb pivot point or surface which aids the guitarist in playing the guitar.

It is a further object of the present invention to provide an improved guitar with neck structure as set forth which is particularly suited for use by a classic or flamenco guitarist.

It is also an object of the present invention to provide an improved guitar with neck structure as set forth which is particularly suited for use by a so-called popular music guitarist.

It is another object of the present invention to provide an improved guitar with neck structure as set forth suitable for use by either a classic or popular music guitarist.

In accomplishing these and other objects, there is provided guitars having neck structure with a series of distinct longitudinally spaced apart substantially transversely extending thumb receiving guide notches formed to lie side by side in the back surface thereof, thereby to provide thumb pivot surfaces which facilitate the fingering of different guitar strings.

Additional objects of the present invention reside in the specific construction of the exemplary guitars and their neck structure hereinafter particularly described in conjunction with the several drawings.

BRIEF DESCRIPTION OF THE DRAWINGS

FIG. 1 is a plan view of the back surface of the neck portion of a guitar according to the present invention.

FIG. 2 is a cross-sectional view taken along line 2—2 of FIG. 1.

FIG. 3 is a side view of the notched side of the neck portion of the guitar of FIG. 1.

FIG. 4 is a plan view of the back surface of the neck portion of another embodiment of guitar according to the present invention.

FIG. 5 is a view taken along the line 5—5 of FIG. 4.

FIGS. 6 and 7 are perspective views of the neck portion of another embodiment of guitar according to the present invention and illustrate the grips of flamenco and popular guitarists, respectively,

DETAILED DESCRIPTION OF THE PREFERRED EMBODIMENTS

Referring to the drawings in more detail, there is shown in FIGS. 1–3 a guitar 10 suitable for use by a classic or flamenco guitarist. The guitar 10 has a base 11, neck structure 12, tuning mechanism 13 and strings 14.

The neck structure 12 extends from the base 11 in a conventional manner. The strings 14 extend along and over transverse ribs 16 on the face or front surface 12E of the neck 12 from the base 11 to the tuning mechanism 13.

The back surface or side of the neck 12 has a longitudinally extending lower portion 12A, a longitudinally extending center or middle portion 12B, and a longitudinally extending upper portion 12C. As shown in FIG. 2, the neck back surface formed by the side-by-side portions 12A, 12B and 12C has a cross-section which is substantially semi-cylindrical in shape.

The lower rounded back portion 12A has distinct thumb receiving transversely extending guide notches or grooves 15 formed therein at longitudinally spaced apart locations. Each of the notches 15 has a width dimensioned to correspond to the width of a person's thumb and has a concave curvature across its width and about its longitudinal axis which substantially conforms to the convex curvature of a thumb.

As shown in FIG. 2, the thumb guide notches 15 are formed at an incline to the face surface 12E of the guitar neck 12 to be suited as a thumb pivot surface. With the exception of the thumb notch designated by the numeral 15A, the longitudinal axes of the notches 15 extend substantially normal to the longitudinal axis of the guitar neck 12. The notch 15A is formed in the sloping surface 17 joining the neck 12 with the base 11. Additionally, in the guitar 12, the middle back portion 12B is formed substantially flat to provide a longitudinally extending smooth surface along which a thumb may slide to facilitate movement of the hand of a guitar player up and down the guitar neck, for example, as when the guitar player is barring. Also, in the guitar 12, the notches 15 are spaced apart longitudinally to define longitudinal extending bridge surfaces 12D between their closest points. The bridge surfaces 12D along with the series of distinct notches 15 function both as a sight and feel guide for enabling a person learning the guitar to judge and feel proper placement of his hand longitudinally along the guitar neck. Further, for the purpose of teaching a person to play the guitar, numerals or other identifying marks can be associated with the thumb guide notches as an additional visual aid for hand movement.

Referring to FIG. 4–5, an alternate embodiment of guitar is there shown identified by the numeral 10'. Parts and portions of the guitar 10' corresponding to those of the guitar 10 are identified by the same numeral with a prime added.

The construction of the guitar 10' corresponds to that of the guitar 10 with the following exceptions. The guitar 10' is constructed for use by a popular music guitarist. As a consequence, the thumb guide notches 15' are formed in the upper portion 12C' of the back of the neck 12', instead of its lower rounded portion 12A'.

Additionally, in the guitar 10', the central neck back portion 12B' is formed, as shown in FIG. 5, as a rounded surface, instead of being flat. Also, the notches 15' are formed substantially contiguous to essentially eliminate any longitudinal extending bridge surfaces therebetween. The rise and fall of the notches 15' along the length of the guitar neck 12', however, still function as a guide which can be felt by the thumb to judge the relative distance of hand movement along the guitar neck 12'. Further, the notches 15', being visibly perceptible, also function as a visual guide for hand placement.

Referring to FIGS. 6 and 7, the neck 12" of another embodiment of guitar 10" according to the present invention is there shown. Corresponding portions of the guitar 10" are identified by the same numerals employed in connection with the guitars 10 and 10', with a double prime added.

The neck 12" shown in FIGS. 6 and 7 is designed for use by either a flamenco guitarist or popular music guitarist, having longitudinally extending rows of notches 15" formed in both the lower and upper neck back portions 12A" and 12C".

In FIG. 6, the grip of a flamenco or classic guitarist is illustrated with the thumb of hand 20 placed in one of the notches 15" formed in the lower back portion 12A". It is noted how the thumb guide notches act as a hand positioning guide to force the discipline the flamenco guitarist to properly hold the guitar. FIG. 7 illustrates the grip of a popular music or modern guitarist. The thumb of the hand 20 is there shown placed in a thumb notch 15" defined in the upper back portion 12C".

I claim:

1. A guitar body, comprising:

base structure; and neck structure mounted to extend from said base structure, said neck structure including a substantially flat front surface along and over which the strings of the guitar extend and also a back surface, said back surface shaped to have a substantially semi-cylindrical cross-section of substantially uniform shape and size along the length of said neck structure and being formed of a lower longitudinally extending portion, a middle longitudinally extending portion and an upper longitudinally extending portion, said back surface having a plurality of distinct longitudinally spaced apart transversely extending thumb receiving guide notches defined therein as a longitudinal row in said lower back surface portion which function as thumb stops and sight and feel guides for aiding a flamenco guitarist to play and in learning to play said guitar, each of said substantially transversely extending thumb receiving guide notches having a longitudinal axis, forming a concave surface about its longitudinal axis and having its longitudinal axis disposed at an incline to said flat neck front surface whereby to define an inclined thumb pivot surface which aids in the playing of said guitar by aiding the pivoting of a player's hand to facilitate the fingering of different guitar strings.

2. The invention defined in claim 1, wherein bridge surfaces are defined between adjacent ones of said longitudinally spaced apart distinct thumb receiving guide notches.

3. The invention defined in claim 1, wherein said middle back surface portion is substantially flat whereby to facilitate controlled hand movement up and down said neck structure during the playing of said guitar.

4. The invention defined in claim 1, wherein a longitudinal row of said thumb receiving guide notches is also formed in said upper back surface portion with their longitudinally axes disposed at an incline to said flat neck front surface whereby said guitar is also suited for use by a popular music guitarist.

5. The invention defined in claim 4, wherein said middle back surface portion is substantially flat whereby to facilitate controlled hand movement up and down said neck structure during the playing of said guitar.

6. The invention defined in claim 1, wherein adjacent ones of said longitudinally spaced apart distinct thumb receiving guide notches are substantially contiguous.

7. In a guitar body, the improvement of neck structure having a substantially flat front surface along and over which the strings of the guitar extend and a back surface, said back surface being formed of a lower longitudinally extending portion, a middle longitudinally extending portion and an upper longitudinally extending portion, said back surface having a plurality of distinct longitudinally spaced apart transversely extending thumb receiving guide notches defined therein as a longitudinal row in said lower back surface portion which function as thumb stops and sight and feel guides for aiding a flamenco guitarist to play and in learning to play the guitar, each of said substantially transversely extending thumb receiving guide notches having a longitudinal axis, forming a concave surface about its longitudinal axis and having its longitudinal axis disposed at an incline to said flat neck front surface whereby to define an inclined thumb pivot surface which aids in the playing of the guitar by aiding the pivoting of a player's hand to facilitate the fingering of different guitar strings.

8. The invention defined in claim 7, wherein said middle back surface portion is substantially flat whereby to facilitate controlled hand movement up and down said neck structure during the playing of the guitar.

9. The invention defined in claim 7, wherein a longitudinal row of said thumb receiving guide notches is also formed in said upper back surface portion with their longitudinal axes disposed at an incline to said flat neck front surface whereby said guitar is also suited for use by a popular music guitarist.

10. The invention defined in claim 9, wherein said middle back surface portion is substantially flat whereby to facilitate controlled hand movement up and down said neck structure during the playing of said guitar.

11. A guitar body, comprising:

base structure; and neck structure mounted to extend from said base structure, said neck structure including a substantially flat front surface along and over which the strings of the guitar extend and also a back surface, said back surface shaped to have a substantially semi-cylindrical cross-section of substantially uniform shape and size along the length of said neck structure and being formed of a lower longitudinally extending portion, a middle longitudinally extending portion and an upper longitudinally extending portion, said back surface having a plurality of distinct longitudinally spaced apart transversely extending thumb receiving guide notches defined therein as a longitudinal row in said upper back surface portion which function as thumb stops and sight and feel guides for aiding a popular music guitarist to play and in learning to play said guitar, each of said substantially transversely extending thumb receiving guide notches having a longitudinal axis, forming a concave surface about its longitudinal axis and having its longitudinal axis disposed at an incline to said flat neck front surface whereby to define an inclined thumb pivot surface which aids in the playing of said guitar by aiding the pivoting of a player's hand to facilitate the fingering of different guitar strings.

12. The invention defined in claim 11, wherein said middle back surface portion is substantially flat whereby to facilitate controlled hand movement up and down said neck structure during the playing of said guitar.

13. In a guitar body, the improvement of neck structure having a substantially flat front surface along and over which the strings of the guitar extend and a back surface, said back surface being formed of a lower longitudinally extending portion, a middle longitudinally extending portion and an upper longitudinally extending portion, said back surface having a plurality of distinct longitudinally spaced apart transversely extending thumb receiving guide notches defined therein as a longitudinal row in said upper back surface portion which function as thumb stops and sight and feel guides for aiding a popular music guitarist to play and in learning to play the guitar, each of said substantially transversely extending thumb receiving guide notches having a longitudinal axis, forming a concave surface about its longitudinal axis and having its longitudinal axis disposed at an incline to said flat neck front surface whereby to define an inclined thumb pivot surface which aids in the playing of the guitar by aiding the pivoting of a player's hand to facilitate the fingering of different guitar strings.

14. The invention defined in claim 13, wherein said middle back surface portion is substantially flat whereby to facilitate controlled hand movement up and down said neck structure during the playing of said guitar.

15. In a guitar body, the improvement of neck structure having a substantially flat front surface along and over which the strings of the guitar extend and a back surface, said back surface having a plurality of distinct longitudinally spaced apart transversely extending thumb receiving guide notches defined therein as a longitudinal row which function as thumb stops and sight and feel guides for aiding a guitarist to play and in learning to play the guitar, each of said substantially transversely extending thumb receiving guide notches having a longitudinal axis, forming a concave surface about its longitudinal axis and having its longitudinal axis disposed at an incline to said flat front surface whereby to define an inclinded thumb pivot surface which aids in the playing of the guitar by aiding the pivoting of a player's hand to facilitate the fingering of different guitar strings.

* * * * *

UNITED STATES PATENT OFFICE
CERTIFICATE OF CORRECTION

Patent No. 4,237,765 Dated 9 December 1980

Inventor(s) ARTHUR F. VALDEZ

It is certified that error appears in the above-identified patent and that said Letters Patent are hereby corrected as shown below:

In column 1, line 44, "at" should be --to--;

In column 2, line 44, following "formed" the words --inclined to the flat neck front surface-- should be inserted;

In column 3, line 63, following "upper" the word --rounded-- should be inserted;

In column 4, line 23, the first occurrence of "the" should be --and--.

Signed and Sealed this

*Twenty-sixth* Day of *May 1981*

[SEAL]

*Attest:*

RENE D. TEGTMEYER

*Attesting Officer* *Acting Commissioner of Patents and Trademarks*